United States Patent [19]

Dreger

[11] Patent Number: 5,666,790
[45] Date of Patent: Sep. 16, 1997

[54] PLATEN SEAL FOR PACKAGING MACHINE

[76] Inventor: Douglas D. Dreger, 13542 Meggers Rd., Kiel, Wis. 53042

[21] Appl. No.: 718,816
[22] Filed: Sep. 27, 1996
[51] Int. Cl.⁶ .................................................. B65B 9/00
[52] U.S. Cl. .................... 53/450; 53/451; 53/550; 53/551; 53/373.7
[58] Field of Search .................... 53/375.9, 375.8, 53/373.7, 450, 451, 550, 551, 552, 553, 554, 555, 479; 493/193, 209

[56] References Cited

U.S. PATENT DOCUMENTS

| 4,185,443 | 1/1980 | Budzyn | 53/555 |
| 4,442,656 | 4/1984 | Wylie, Sr. | 53/552 |
| 4,825,623 | 5/1989 | Ross | 53/551 |
| 4,938,003 | 7/1990 | Seppala | 53/552 |
| 5,546,733 | 8/1996 | Paltrinieri | 53/551 |

*Primary Examiner*—John Sipos
*Assistant Examiner*—Gene L. Kim
*Attorney, Agent, or Firm*—Lee, Mann, Smith, McWilliams, Sweeney & Ohlson

[57] ABSTRACT

A platen seal for a vertical form fill and seal machine which uses unsupported polyethylene films to wrap products which require absolute seal integrity. The platen includes a set of lateral seal members in the form of wings on the top and bottom of the platen to seal gaps between platen segments without causing burn through of the film.

7 Claims, 2 Drawing Sheets

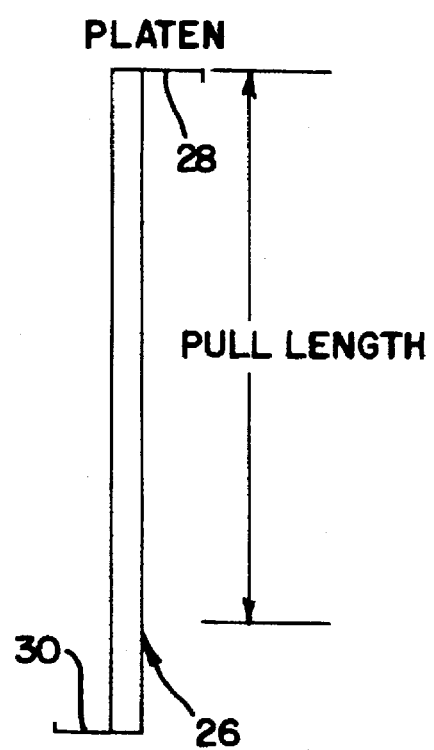
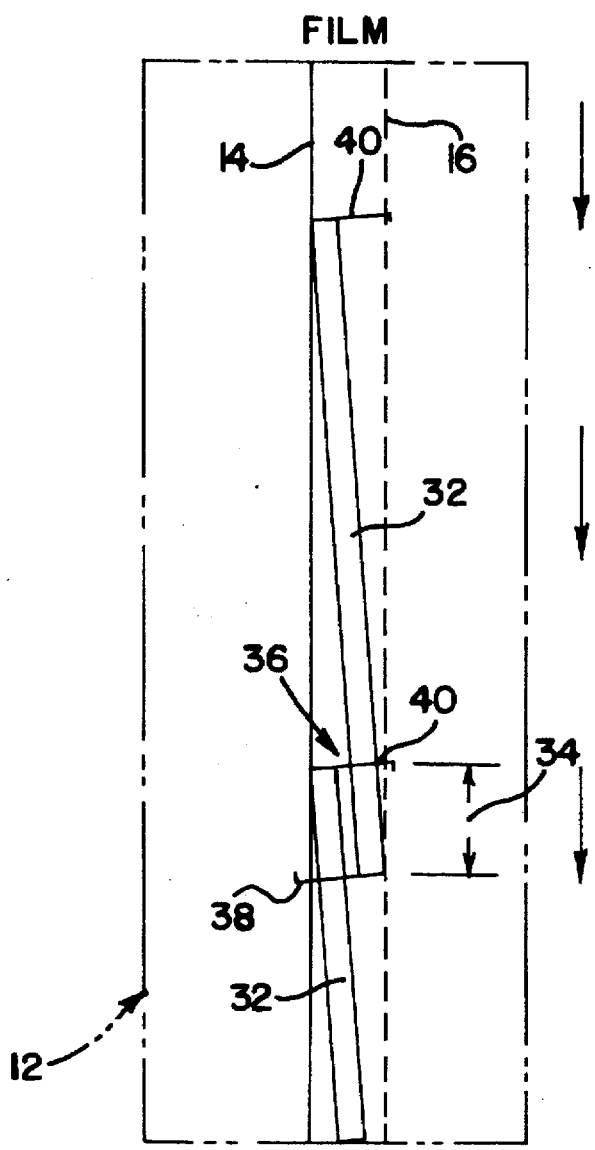

PLATEN SEAL FOR PACKAGING MACHINE

BACKGROUND OF THE INVENTION

This invention relates to sealing machines, and in particular to a platen seal for unsupported plastic films in a sealing machine, the platen being used to form a longitudinal seal in the plastic film.

Vertical form fill and seal machines are well known. For example, U.S. Pat. No. 4,288,965, the disclosure of which is incorporated herein by reference, is directed to such a machine. The invention disclosed herein is intended to be utilized in connection with a vertical form fill and seal machine, although it can also be used in other applications.

For many years manufacturers of vertical form fill and seal (VFFS) equipment have been concerned about seal quality. This is particularly important when materials such as unsupported polyethylene are used as the packaging material.

To seal unsupported polyethylene, or any material which reverts to a molten state as it is being sealed, the seal area is sealed with a heated sealing bar which is placed in contact with the film at a given pressure for a preset amount of time to have the sealing process take place by fusing the material together into a solid mass. Three key parameters determine the quality of the seal:

1) Temperature
2) Time
3) Pressure.

Once the seal has been completed by melting the film, it is necessary to cool the material to solidify the seal and recapture the lost strength before applying any pressure on the seal area. This is generally done by blowing cooling air onto the seal area which supporting the film in a relaxed condition, or contacting the seal area with a cooling bar which extracts the excess heat by conduction rather than convection.

Several forms of back seal sealing systems have been used over the years. One of these involves the use of a hot air blast directed on the moving film to seal the overlapped film. This works well when the film is in constant movement, but for intermittent motion, as used with the VFFS equipment, seal continuity is a serious problem with these systems. A system of this type is described in U.S. Pat. No. 5,466,326 for a continuous motion machine, the disclosure of which is incorporated therein by reference.

For many years, the traditional method of making back seals on a VFFS machine has been to use a heated bar referred to in the industry as a platen. This platen is heated to a specific temperature which is controlled by a closed loop temperature controller.

The time aspect of the seal is controlled by a timer or timer integral to the main controller.

The platen is generally positioned using a pneumatic cylinder in conjunction with some form of mechanical linkage. This provides a relatively constant pressure. As a result, time, temperature and pressure are controlled to provide the desired seal.

The platen is always made longer than the film pull to avoid any gaps in the back seals. In the event the bag length is longer than the length of the platen, a double pull is made to insure an adequate overlap in platen sealing. This works extremely well for materials which tolerate a double sealing operation.

However, materials such as polyethylene have a tendency to exhibit burn through if two sealing operations are attempted in quick succession. This causes a loss in seal quality which is unacceptable in many applications.

To attempt to resolve the burn through which still maintaining a back seal overlap, the platen has been skewed slightly in many applications. This allows an overlap without double sealing. The only problem is that there is a gap between seals which in most cases is closed by the end seal. This solution is an answer for about 95% of the applications, but back seal leaks can still occur if the gap is not covered by the end seal.

If this is not an alternative, another method must be found to insure a continuous seal with a minimal amount of overlap. The device according to the present invention fulfills this requirement in a unique and novel way.

SUMMARY OF THE INVENTION

The invention relates to a seal assembly for forming a longitudinal seal in a plastic film. The assembly comprises an elongated, heated platen which is periodically brought into sealing contact with the plastic film to heat seal together overlapping portions of opposite longitudinal side edges of the plastic film. The platen extends at an oblique angle with respect to the longitudinal side edges during sealing thereof. Lateral seal members are provided, extending in opposite directions from opposite ends of the platen to complete the seal.

In accordance with the preferred form of the invention, the lateral seal members comprise elongated bars. The seal members are preferably parallel to one another.

In accordance with a method according to the invention, the method comprises the steps of first orienting the platen at an oblique angle with respect to the longitudinal side edges of the plastic film, and then bringing the platen periodically into sealing contact with the plastic film to seal the longitudinal side edges, with seals formed by the lateral seal members overlapping seals formed by the platen. In the process, the seal formed by a leading lateral seal member overlaps a preceding seal formed by the platen. Similarly, the seal formed by a lagging lateral seal member overlaps a succeeding seal formed by the platen.

BRIEF DESCRIPTION OF THE DRAWINGS

The invention is described in greater detail in the following description of an example embodying the best mode of the invention, taken in conjunction with the drawing figures, in which:

FIGS. 3a and 3b depict the modified skewed platen according to the invention and how the successive platen seals are formed in a plastic film.

DESCRIPTION OF AN EXAMPLE EMBODYING THE BEST MODE OF THE INVENTION

Figure 1B:
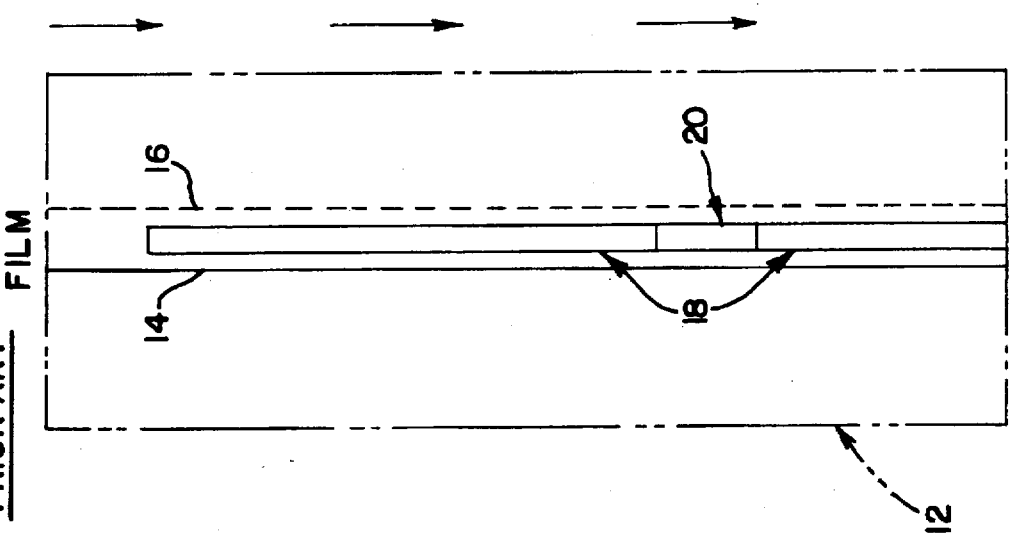
FIGS. 1a and 1b depict a typical platen and a typical method of forming a longitudinal seal in a film.
Figure 1A:
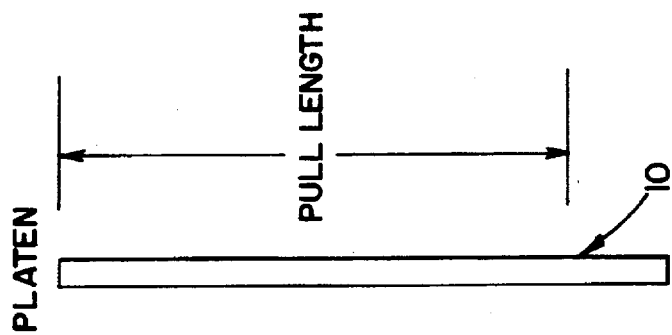

Turning first to FIGS. 1a and 1b, a typical platen sealing system is shown, which is used to seal any type of resistance sealed laminate films. A conventional platen 10 contains a heater (not illustrated) and an appropriate feedback device such as a thermocouple or RTD in order to maintain a preset platen temperature. The maximum pull length to avoid gaps in the back seal is the platen length, but in practice, the pull length is usually somewhat shorter than the platen length, and is, therefore, illustrated in FIG. 1a in relation to the platen.

FIG. 1b illustrates a longitudinal seal made in a film 12 having overlapping side edges, and the film, therefore, being formed into a tubular cross section. The outer margins of the overlapping side edges of the film are depicted at 14 and 16 with the edge 16 overlapped by the edge 14, or vice versa (not illustrated). Successive seals made by the platen 10 in the film 12 are shown at 18, with an overlap 20 being illustrated for the pull length shown in FIG. 1a. The overlap 20 is a function of the pull length and the platen length and reoccurs with each successive platen seal. When a very short bag is being prepared using a long platen 10, it is possible to overlap continually with some portions of the overlap receiving more than two sealing operations. The length of the platen 10 can be made proportional to the pull length and length of the bag being formed for specific applications. If the vertical form fill and seal machine is set up to run a wide variety of bag sizes, multiple sealing operations involving more than two cycles are not uncommon.

As explained above, for materials such as unsupported polyethylene, multiple or overlapping seal areas 20 will almost always burn through in the second sealing cycle due in part to the elevated temperature and also to the diminished cross-sectional thickness of the film 12. Burn through produces packages which are not smooth in appearance, and, therefore, not aesthetically acceptable. Burn through causes holes in the film, producing packages which are not hermetically sealed. Packages of this type are generally unacceptable in most applications.

Figure 2:
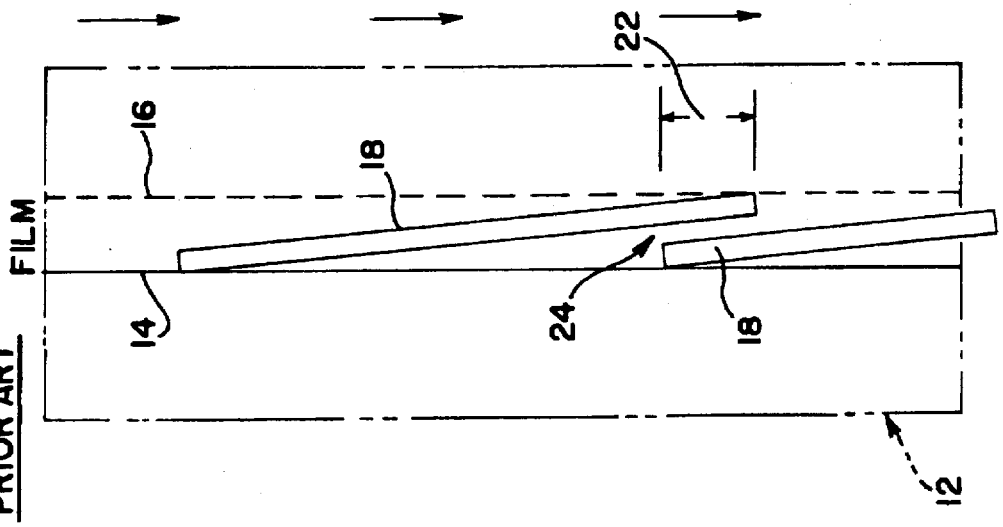
FIG. 2 shows a modification of the sealing of the film shown in FIG. 1b, where successive platen seals are skewed from one another.

In order to resolve burn through, the platen 10 is often skewed, as illustrated in FIG. 2. Skewing the platen allows a continuous back seal with an area 22 where the seals lap, but do not overlap, and, therefore, does not involve any multiple sealing operations. This eliminates the problem of burn through, but does not produce a hermetic package due to a gap 24 between the adjacent seals 18.

The film overlap and the gap 24, as well as the skew angle of the successive seals 18, are exaggerated in the drawing figures. The gap 24 can obviously be minimized by adjusting the platen length and the skew angle to the package length being formed. While this can be adjusted for specific situations, most VFFS equipment is designed to operate over a wide range of film pull lengths with a single length platen 10. As a result, the overlap generally occurs randomly in packages, and when a skewed sealing platen 10 is used, as illustrated in FIG. 2, the lap 22 generally occurs randomly in packages, resulting in packages which are not hermetically sealed.

To eliminate the problem just explained, a revised platen configuration illustrated in FIGS. 3a and 3b has been developed. A platen 26, substantially identical to the platen 10, is formed, and is preferably used in a skew format as shown in FIG. 2, but the platen 26 includes opposite lateral seal members in the form of wings 28 and 30 extending from opposite ends of the platen 26 in opposite directions. The wings 28 and 30 are very narrow to minimize any area of multiple sealing. Being extensions of the heated platen 26, the wings 28 and 30 are held to nearly the same temperature as the sealing surface of the platen 26.

Turning to FIG. 3b, successive seals of the platen 26 are depicted at 32. A lap area 34 is depicted, with a gap 36 between successive seals 32 that has been sealed by wing seals 38 and 40. As shown, the leading wing seal 38 overlaps a preceding seal 32 made by the platen 26, while the lagging wing seal 40 overlaps a succeeding seal 32 formed by the platen 26. In this manner, the gap 36 is sealed, and no matter where the lap 34 occurs in a subsequently-formed bag, the longitudinal seam in the bag is fully sealed.

The areas sealed by the wing seals 38 and 40 obviously overlap the seals 32 and thus form a second seal of the plastic film 12. However, the narrow widths of the wing seals 38 and 40 prevent burn through of the plastic film where there is a second seal.

Various changes can be made to the invention without departing from the spirit thereof or scope of the following claims.

What is claimed is:

1. A seal assembly for forming a longitudinal seal in a plastic film, the plastic film having opposite side edges which are overlapped for sealing, comprising a. an elongated, heated platen which is periodically brought into sealing contact with the plastic film to heat seal together overlapping portions of the opposite longitudinal side edges of the plastic film, said platen extending at an oblique angle with respect to the longitudinal side edges during sealing thereof, and the plastic film being advanced past the platen so that the periodic sealing contact results in a series of sequential, non-overlapping heat seals, and b. lateral seal members extending in opposite directions from opposite ends of said platen to form lateral seals joining said non-overlapping heat seals.

2. A seal assembly according to claim 1 in which said lateral seal members comprise elongated bars.

3. A seal assembly according to claim 1 in which said lateral seal members are parallel.

4. A method of sealing together overlapping portions of opposite lateral side edges of an elongated plastic film, using an elongated, heated platen having lateral seal members extending in opposite directions from opposite ends of the platen, the method comprising the steps of a. orienting the platen at an oblique angle with respect to the longitudinal side edges, b. bringing the platen into sealing contact with the plastic film to seal the longitudinal side edges, and c. repeatedly repeating step "b" while the elongated plastic film is advanced past the platen, with seals formed by the lateral seal members overlapping seals formed by the platen.

5. A method according to claim 4 in which the seal formed by a leading lateral seal member overlaps a preceding seal by said platen.

6. A method according to claim 4 in which the seal formed by a lagging lateral seal member overlaps a succeeding seal by said platen.

7. A method according to claim 4 in which the seal formed by a leading lateral seal member overlaps a preceding seal by said platen, and the seal formed by a lagging lateral seal member overlaps a succeeding seal by said platen.

* * * * *